Aug. 3, 1943.   P. S. BARNHART   2,325,584
METHOD OF MAKING COATED LAMINATED PAPER
Original Filed Feb. 1, 1937
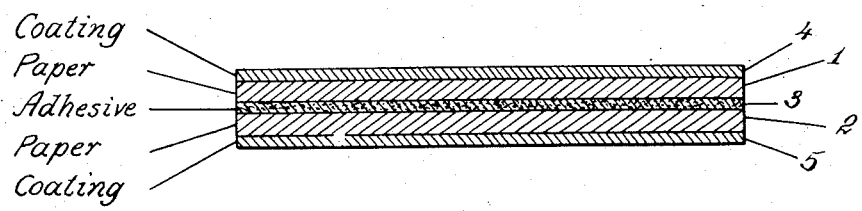
INVENTOR
Philip S. Barnhart
BY
Marshall + Hawley
ATTORNEYS Patented Aug. 3, 1943

2,325,584

UNITED STATES PATENT OFFICE 2,325,584

METHOD OF MAKING COATED LAMINATED PAPER

Philip S. Barnhart, Westfield, Mass., assignor to Westfield River Paper Company, Inc., Russell, Mass., a corporation of Massachusetts Original application February 1, 1937, Serial No. 123,334. Divided and this application February 2, 1940, Serial No. 316,909

4 Claims. (Cl. 154—40)

This invention relates to a method of making coated laminated paper, and this application is a division of my application Serial No. 123,334, filed February 1, 1937.

Laminated paper is well known in the art, having been used extensively for various purposes. Two or more plies or sheets have been laminated in order to gain additional strength, added weight, greater transparency, in the case of papers, such as glassine, and also to obtain moisture resistant properties.

Various laminating cements have been used, such as glue, starch, paste, wax or wax-resin mixtures, resin-nitro cellulose-plasticizer-wax combinations, rubber-paraffine wax or other wax combinations and rubber-wax-rosin-plasticizer combinations, etc.

Coated papers have also become well known in the art, the coating being applied to gain various effects, such as gloss, better appearance, decorative effects and moisture resistant properties. These coatings have been applied to one or both surfaces of sheets, such as sheets of regenerated cellulose, glassine, cellulose acetate and other sheet materials, thus giving moisture resistant properties as well as the other effects above mentioned. Such sheets have been coated with various solutions or lacquers, as solutions of nitrocellulose, resins and plasticizers and wax combinations, resin and wax combinations, chlorinated rubber base lacquers, etc.

The same types of lacquers have also been used on opaque papers and it is possible to add to the lacquers coloring matter or pigments, also metal powders, such as aluminum powder, bronze powder, and the like, to give decorative effects.

In order to further enhance the appearance and utility of laminated sheets it has been found advantageous to coat the laminated sheet, either on one or both surfaces, with a coating solution which will enhance the moisture resistant properties of the sheet. There has been a considerable demand for paper which has a greater moisture resistant property than can be secured by the usual laminated paper, such as laminated glassine paper, or by a single sheet of coated glassine paper. This increased moisture proof property is particularly desirable when the paper is used as a wrapping for hygroscopic food products, such as powdered extracts, powdered desserts, malted milk and similar substances.

Difficulties have been encountered in producing a coated laminated sheet since coated papers are force dried, usually in ovens, and the drying temperature tends to cause the laminating cement or binder, which holds the sheet together, to fuse, melt or soften, thus permitting the laminated sheets to separate during the coating process.

It is not practical to coat the sheets first and then laminate them since the coated surfaces would be subjected to abrasion during the laminating process, causing blemishes and scratches and rendering the product unsaleable.

In my solution of the problem in coating a laminated paper, I employ a coating of lacquer solution or other thermoplastic composition containing a solvent which evaporates and promotes drying of the coating on the laminations at a temperature lower than the elevated temperature which previously melted and rendered the cementing binder effective when integrating or bonding the sheets together in laminated form preliminary to coating it. In this way I apply the coating as the last step in the process and thus avoid handling or machine treating of the finished paper after the decorative or moisture-proof coating is applied.

This invention has for its salient object to provide a method of manufacturing a coated laminated sheet, so worked out that the laminating cement or binder will not fuse or soften during the drying of the coating films, thus preventing the separation of the laminated sheet.

In other words, an object is to provide a method of manufacturing coated laminated paper in such a way that the application of heat to a coating solution on the paper, for drying the coating by evaporating the solvent therefrom, does not melt and loosen the binder used in previously bonding the laminations into a unitary sheet.

Further objects of the invention will appear from the following specification taken in connection with the drawing which forms a part of this application and in which the single figure illustrates in section greatly enlarged section of a coated laminated sheet constructed in accordance with the invention.

The drawing illustrates in section a laminated sheet comprising a pair of sheets 1 and 2 of paper which are laminated or secured together by an adhesive or cement or binder 3. The laminated sheet is coated on both surfaces by coatings 4 and 5.

Although it is not the intention to limit the invention to any particular or specific ingredients for the binder and the coating composition, certain examples of binders and coating compositions will be set forth in order to give examples of compounds which are satisfactory.

Furthermore, it should be understood that the invention is not limited to any specific type of paper, but may be adapted for coated laminated glassine sheets or for coated laminated sheets of regenerated cellulose, cellulose acetate, etc.

A preferred type of cement or binder which is particularly adapted for use in laminating sheets of glassine or cellulose derivative is a cement, including as ingredients paraffine wax, rubber, rosin and petrolatum. This combination gives the laminated sheet the desired properties as to strength, increased transparency, moisture resistance and adhesion and can be readily applied in the laminating operation.

A preferred binder may contain these ingredients in the following proportions: Wax 40–63%; rosin 20–45%; rubber 3–12%, and petrolatum 7–13%.

As a more specific example, these ingredients may be combined as follows: Wax 61%; rosin 27%; rubber 5%, and petrolatum 7%. Paraffine wax having a melting point of 155° F. and petrolatum having a melting point of 125° F., are preferred.

The coating composition which has been found particularly desirable may consist of the following ingredients combined in the proportions stated: Chlorinated rubber 40–50%; resin 25–38%; paraffine wax 2–7%, and a plasticizer, such as di-butyl phthalate, 15–21%. The resin which has been found particularly adaptable for such use comprises glycerol abietate 20–25% and para coumarone 5–13%. The paraffine wax preferably has a melting temperature of 143–145° F.

As a still more specific example of a coating composition, the ingredients above set forth may be combined as follows: Chlorinated rubber 46% (65–68% chlorine); glycerol abietate 19%; paraffine wax $6\frac{1}{10}$%; di-butyl phthalate $16\frac{1}{10}$%, and para coumarone 12%.

After these ingredients are combined in these approximate proportions the composition is dissolved in any suitable hydro-carbon solvent, such as benzol, toluol, xylol, etc., to give a solution of the desired viscosity.

In making the coated laminated sheet the sheets are first laminated in any well known manner by the use of a cement or binder which fuses at an elevated temperature and has the characteristics set forth, and thereafter the laminated sheet is coated with the coating composition on one or both surfaces by passing the sheet through a coating machine having coating mechanism and having an oven in which the lower temperature is maintained between 145–170° F., depending, of course, on the fusion point or temperature of the cement between the laminated plies or sheets.

A laminated sheet so treated has an extremely high gloss, is flexible, transparent and has greatly increased moisture resistance properties. The coating solution or thermoplastic composition may consist of a heat sealing or thermoplastic base lacquer and, as stated, can be applied on one or both sides of the laminated sheet.

Although various cements and coating compositions may be used, the following essential or requirement must be adhered to, namely, that the drying temperature required for drying the coating composition must be lower than the fusing, melting or softening temperature of the binder or cement used to laminate the sheets.

This invention is presented to fill the need for a useful method of making coated laminated paper. It will be understood how various modifications in construction, mode of operation, use and method, may and often do occur to others, especially so after benefiting from knowledge of an invention. Accordingly, this disclosure is exemplary of the principles of the invention and its equivalents without being limited to the present showing thereof.

What I claim is:

1. A method of making a coated laminated product, consisting in uniting at least two sheets of glassine paper by applying a binder between the inner surface of the sheets, which binder comprises at least 40% wax, fusing the binder by heat at an elevated temperature to render it effective in uniting said sheets, thereafter applying a coating of thermoplastic base lacquer to at least one surface of the united sheets, and then drying the applied coating by evaporating the solvent therefrom at a temperature lower than that which previously fused the binder and without causing separation of the united sheets.

2. A method of making a substantially transparent coated laminated product, comprising uniting sheets of glassine paper with a binder comprising at least 40% wax which binder is fused and rendered effective by heat at an elevated temperature, thereafter applying an outer coating of thermoplastic composition containing a volatile solvent to the laminated paper, and then drying the coated paper at a temperature lower than that which previously fused the binder and which will cause no separation of the laminated sheets of paper.

3. A method of making a coated laminated product, comprising uniting sheets of glassine paper with a binder which is fused and rendered effective by heat at an elevated temperature, thereafter applying an outer coating of thermoplastic composition containing a volatile solvent to the laminated paper, and then drying the coated paper at a temperature approximately between 145° and 170° F., the latter temperature being lower than that which previously fused the binder.

4. A method of making a coated laminated product, comprising uniting sheets of glassine paper with a binder containing 40% to 63% of wax with 20% to 45% of rosin and 3% to 12% of rubber as well as 7% to 13% of petrolatum, which binder is fused and rendered effective by heat at an elevated temperature, thereafter employing a thermoplastic composition consisting of 40% to 50% of chlorinated rubber with 25% to 38% of resin and 2% to 7% of paraffine as well as 15% to 21% of di-butyl phthalate together with a volatile solvent and applying such composition as a coating to the laminated paper, and then drying the coated paper at a temperature approximately between 145° and 170° F., the latter temperature being lower than that which previously fused the binder.

PHILIP S. BARNHART.